US012623648B2

(12) United States Patent
Boehm et al.

(10) Patent No.:  US 12,623,648 B2
(45) Date of Patent:      May 12, 2026

(54) DRIVE DEVICE FOR AN ELECTROMECHANICAL BRAKE DEVICE, BRAKE DEVICE

(71) Applicant: Robert Bosch GmbH, Stuttgart (DE)

(72) Inventors: Mark Boehm, Lehrensteinsfeld (DE); Sebastian Martin Reichert, Affaltrach (DE); Willi Nagel, Remseck/Hochdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/040,295

(22) PCT Filed: Jul. 5, 2021

(86) PCT No.: PCT/EP2021/068456
§ 371 (c)(1),
(2) Date: Feb. 2, 2023

(87) PCT Pub. No.: WO2022/028790
PCT Pub. Date: Feb. 10, 2022

(65) Prior Publication Data
US 2023/0286482 A1      Sep. 14, 2023

(30) Foreign Application Priority Data
Aug. 6, 2020     (DE) ..................... 10 2020 209 947.2

(51) Int. Cl.
*B60T 13/74* (2006.01)
(52) U.S. Cl.
CPC .......... *B60T 13/741* (2013.01); *B60T 13/745* (2013.01)

(58) Field of Classification Search
CPC .... B60T 13/741; B60T 13/745; B60T 13/746; F16D 55/226; F16D 65/18; F16D 2121/24; F16D 2125/50; F16D 2125/06
See application file for complete search history.

(56) References Cited

U.S. PATENT DOCUMENTS 9,903,462 B2 *   2/2018  Hu ............................. F16H 1/46
10,393,199 B2 *  8/2019  Tandler ................... H02K 7/06
(Continued)

FOREIGN PATENT DOCUMENTS

CN      104145140 A     11/2014
DE   102017204765 A1    10/2018
(Continued)

OTHER PUBLICATIONS

International Search Report for PCT/EP2021/068456, Issued Oct. 25, 2021.

*Primary Examiner* — Huan Le
(74) *Attorney, Agent, or Firm* — NORTON ROSE FULBRIGHT US LLP

(57)      ABSTRACT
A drive device for an electromechanical brake device, in particular a brake booster. The drive device includes an electric motor that has a housing and a rotor shaft rotatably mounted in the housing. The rotor shaft is coupled to a transmission, in particular a planetary gear train that comprises a ring gear. The rotor shaft is rotatably mounted in the housing by at least one roller bearing. The roller bearing is held in a bearing seat of a bearing cover situated in the housing. The bearing cover has a ring-gear portion, which is spaced apart from the bearing seat and in which the ring gear is situated.

12 Claims, 4 Drawing Sheets

(56)                      References Cited

U.S. PATENT DOCUMENTS

| 11,208,088 | B2 * | 12/2021 | Micke .................. B60T 8/4018 |
| 2009/0044645 | A1 * | 2/2009 | Buescher ............. E05F 15/622 |
| | | | 74/89.34 |
| 2018/0298546 | A1 | 10/2018 | Kim et al. |
| 2020/0062231 | A1 | 2/2020 | Micke |

FOREIGN PATENT DOCUMENTS

| JP | 2008133849 | A | 6/2008 |
| WO | 0029760 | A2 | 5/2000 |
| WO | 2018099636 | A1 | 6/2018 |

* cited by examiner

DRIVE DEVICE FOR AN ELECTROMECHANICAL BRAKE DEVICE, BRAKE DEVICE

FIELD

The present invention relates to a drive device for an electromechanical brake device, in particular a brake booster, comprising an electric motor that has a housing and a rotor shaft rotatably mounted in the housing, which rotor shaft is coupled to a transmission that has a ring gear, wherein the rotor shaft is mounted in the housing by at least one roller bearing, and wherein the roller bearing is held in a bearing seat of a bearing cover situated in the housing.

The present invention further relates to a brake device for a vehicle, in particular a motor vehicle comprising a hydraulic pressure generator, which is in particular fluidically connected to at least one brake circuit comprising at least one hydraulically actuatable brake device and a drive device for driving the hydraulic pressure generator.

BACKGROUND INFORMATION

Propulsion devices of the aforementioned type are available in the related art. Given the increasing electrification of motor vehicles in particular, the desire to achieve individual brake boosting is increasing, as well as the ability to perform braking operations independently of brake pedal operation, e.g., in autonomous driving operation. Brake devices are therefore increasingly used in vehicles, which generate a brake pressure, not, or not only, by way of a braking force applied by a user on a brake pedal, but rather detached therefrom, with the aid of an electrically controllable actuator or an electrically controllable drive device. To this end, it is conventional to employ a hydraulic pressure generator in brake devices, which generator is drivable by means of a drive device in order to generate upon demand a hydraulic pressure in a brake circuit or brake system, independently of a brake pedal operation by a user, in a manner useful for performing one or more brake operations. In particular, brake devices are available in the related art in which the controllable drive device replaces the conventional vacuum brake booster.

SUMMARY

A drive device according to the present invention may have the advantage that it is particularly space-saving, facilitates assembly, and reduces assembly and manufacturing costs. According to the present invention, it is provided that the bearing cover of the drive device has a ring-gear portion, which is spaced apart from the bearing seat for the roller bearing and in which the ring gear is situated. Thus, the drive device according to the present invention results in both the roller bearing and the ring gear being retained by the bearing cover in the housing of the drive device, in particular the electric motor. Whereas a separate bearing for the ring gear has conventionally been provided, in particular welded in the outer ring of the roller bearing, the present invention results in an easier assembly in which the laborious welding process is in particular eliminated.

According to a preferred further development of the present invention, the bearing cover in the ring-gear portion comprises at least one, in particular multiple radial elevations and/or radial recesses, which are spaced apart in the circumferential direction from one another, and which cooperate with radial recesses and/or radial elevations of the ring gear inserted in the ring-gear portion in order to prevent rotation. A rotation lock or anti-rotation means is thus formed between the bearing cover and the ring gear, thus preventing the ring gear from rotating along. This ensures that the ring gear is fixedly retained in the housing. By virtue of the radial elevations and/or radial recesses of the ring gear on the one hand and the radial recesses or radial elevations of the ring gear portion on the other hand, a simple positive-locking connection in the circumferential direction is ensured. Preferably, at least one radial recess is present for each of the radial elevations, into which recess the respective radial elevation can engage.

Furthermore, according to an example embodiment of the present invention, it is preferably provided that the radial elevations and/or radial recesses are situated in an evenly distributed manner about the circumference of the ring gear portion. This even distribution ensures that an even transmission of force from the ring gear to the ring-gear portion is ensured, which results in an even load and thus a long service life for the drive device.

According to a preferred further development of the invention, the ring gear portion forms the ring gear, so that the ring gear is formed integrally with the bearing cover. In this case, the ring gear thus constitutes an integral part of the bearing cover. This reduces the number of individual parts of the drive device and reduces manufacturing costs. In particular, due to the integral design, an additional anti-rotation feature is omitted, thereby further reducing manufacturing costs compared to the aforementioned embodiment.

According to one preferred embodiment of the present invention, the ring gear together with multiple planetary gears and a sun gear, which is in particular situated in a rotationally fixed manner on the rotor shaft of the electric motor, form a planetary gear train. The planetary gear train in particular reduces the rotational speed of the electric motor and increases the torque. Preferably, the planetary gears are rotatably supported on a planetary gear support, and the planetary gear support forms the output shaft of the planetary gear train.

Furthermore, according to an example embodiment of the present invention, it is preferably provided that the transmission is a spindle drive or spindle transmission having an axially slidably mounted spindle, and having a spindle gear that is rotatably supported and engaged with the spindle by a helical gearing. Preferably, the ring gear is centered on the spindle drive or spindle transmission, e.g., on a bearing cover of the transmission or spindle drive, which is situated so as to be fixed to the housing. For this purpose, the ring gear preferably comprises an axially projecting centering portion, which is capable of being axially pushed onto or is axially pushed on the spindle transmission, in particular on a cylindrical sheath wall portion of the bearing cover. For a better connection, the centering portion preferably comprises multiple pinch ribs protruding radially inwardly or in the direction of the spindle transmission. Optionally, the ring gear also comprises multiple pinch ribs uniformly distributed on its outer sheath wall, which in particular cooperate with the bearing cover of the drive device. The advantageous centering ensures that ring gear and spindle gear or transmission and spindle transmission are always optimally aligned with one another. According to an alternative embodiment, it is preferably provided that a further roller bearing is situated between the spindle gear and the ring gear.

A brake device according to the present invention includes the drive device according to the present invention. This yields the advantages already mentioned above.

The present invention will be explained in greater detail hereinafter with reference to the figures.

DETAILED DESCRIPTION OF EXAMPLE EMBODIMENTS

Figure 1:
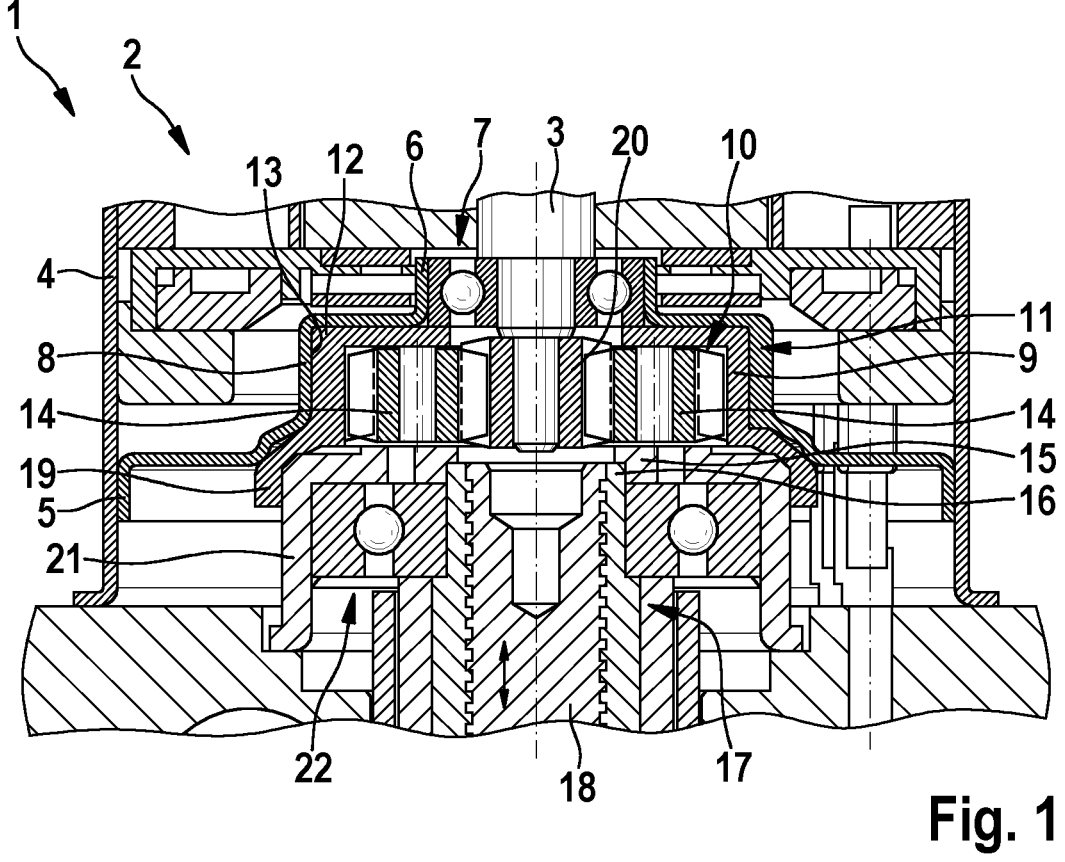
FIG. 1 shows an exemplary brake device in a simplified longitudinal sectional view, according to an example embodiment of the present invention.

FIG. 1 shows, in a simplified sectional view, an advantageous brake device 1 for a motor vehicle (not shown here in more detail). The brake device 1 comprises a drive device 2 with an electric motor, of which only the rotor shaft 3 and a housing 4 are shown in FIG. 1. The rotor shaft 3 is rotatably supported in the housing 4 and in particular supports a rotor that cooperates with a stator, which is fixed to the housing, so that when current is supplied to the stator or to a drive winding of the stator, a torque is applied to the rotor and thus to the rotor shaft 3, by which torque the brake device 1 is to be driven. In the present case, the brake device 1 is in particular an electromechanical brake booster, in which the rotational energy of the rotor shaft 3 is to be converted into translational energy in order to displace a hydraulic piston. In particular, the drive device 2 is designed to drive a brake master cylinder of a brake system.

A bearing cover 5 is situated in the housing 4, which extends substantially transversely through the housing 4 and abuts against an inner side of the housing 4 at least in portions and is, e.g., welded, clamped, screwed, or glued to the housing 4. The bearing cover 5 is shaped in a cup-shaped fashion, wherein it comprises multiple portions in axial extension having various inner diameters.

The bearing cover 5 thus comprises a first portion that forms a bearing seat 6 for a roller bearing 7, by way of which the rotor shaft 3 is rotatably supported in the bearing cover 5, and thus in the housing 4. The bearing seat 6 thus has an inner diameter, which is in particular slightly smaller than the outer diameter of the outer ring of the roller bearing 7, so that a press-fit exists in the bearing seat 6 between the roller bearing 7 and the bearing cover 5.

The bearing seat 6 is adjoined by a ring gear portion 8, which has an inner diameter that is significantly larger than the inner diameter of the bearing seat 6. A ring gear 9 of a planetary gear train 10 is situated in the ring gear portion 8. The ring gear 9 is connected to the bearing cover 5 in a rotationally fixed manner by means of a rotation lock 11, so that the ring gear 9 cannot rotate along.

The planetary gear train 10 further comprises multiple planetary gears 14, as shown in FIG. 1, which are rotatably supported on a planetary gear support 15, which itself is also rotatably supported, in particular around the axis of rotation of the rotor shaft. The planetary gears 14 are engaged with the ring gear 9 as well as with a sun gear 20 situated in a rotationally fixed manner on the rotor shaft 3.

Figure 2:
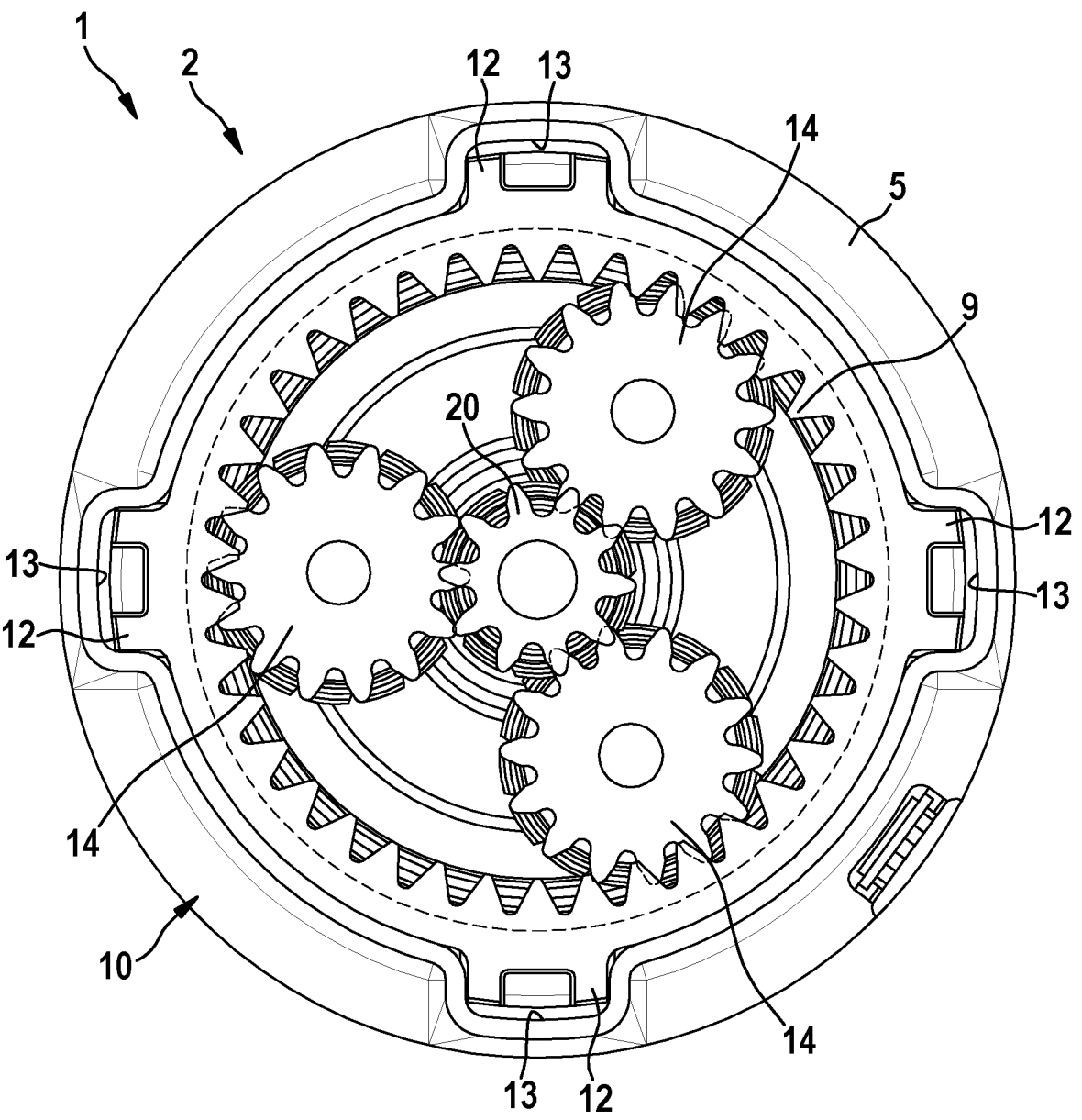
FIG. 2 shows a perspective detail view of the brake device, according to an example embodiment of the present invention.
Figure 4:
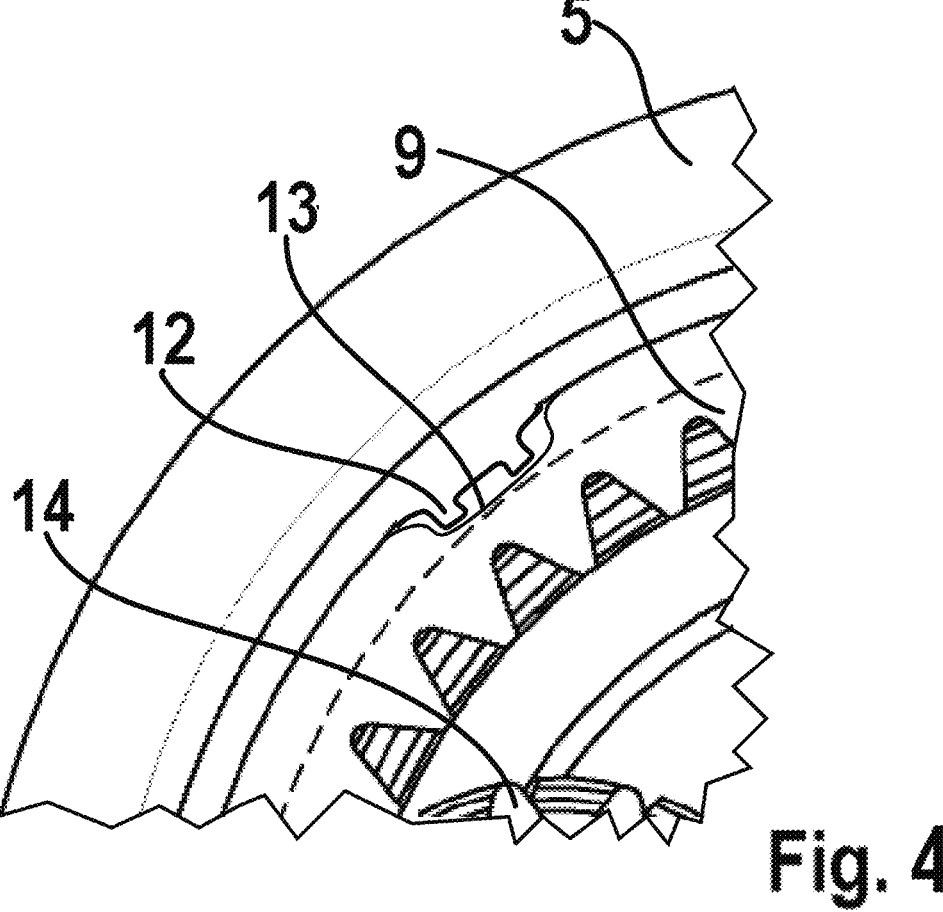
FIG. 4 shows an alternative or additional view of a portion of the ring gear and bearing cover.

FIG. 2 shows an axial plan view of the drive device 2 in the area of the planetary gear train 10. At its outer periphery, the ring gear 9 comprises multiple, in the present case four, evenly spaced radial elevations 12, which lie in correspondingly designed and situated radial recesses 13 of the bearing cover 5 in a positively locking manner and at least substantially free of play, particularly preferably press-fitted. The radial projections 12 inserted in the radial recesses 13 ensure that the ring gear 9 is situated in a rotationally fixed manner with the bearing cover 5, and is thus fixed to the housing. As a result, only the planetary gears 14 along with the planetary gear support 15 can rotate in the ring gear 9 as they are driven by the sun gear 20. Alternatively or additionally, one or more further radial recesses 13 can be provided in the ring gear 9 in which corresponding radial elevations 12 of the bearing cover 5 are positioned as shown in FIG. 4.

Alternatively or in addition to the positive locking torque support in the circumferential direction, a further embodiment example provides that the torque support or torque entrainment occurs axially, e.g., by means of heat staking.

According to the present embodiment example, the planetary gear support 15 is formed by a spindle gear 16 of a spindle transmission 17, which also comprises a spindle 18 that is operatively connected to the spindle gear 16 and is supported in an axially displaceable manner, as indicated by a double arrow in FIG. 1, which spindle is in particular coupled to a piston of the main brake cylinder for the displacement thereof.

On its front face facing the spindle gear 16, the ring gear 9 has an axially projecting centering portion 19, the inner diameter of which at least substantially corresponds to the outer diameter of a cylindrical sheath wall portion of a bearing cover 21 of the spindle transmission 17. The spindle transmission 17 comprises the substantially cup-shaped bearing cover 21, which is situated so as to be fixed to the housing and supports a roller bearing 22 for rotatable support of the spindle gear 16. In this case, an outer ring of the roller bearing 22 is press-fitted in the bearing cover 21, and the inner ring of the roller bearing 22 is seated on the outer sheath surface of the spindle gear 16, so that the spindle gear 16 is advantageously rotatably supported with minimal wear. The centering portion 19 lies in particular radially against the outer sheath wall on the sheath wall portion of the bearing cover 21, in particular under a radial preload, whereby the ring gear 9 is advantageously centered or aligned and held on the bearing cover 21, and thus on the spindle transmission 17. This improves the robustness and functional capability of brake device 1 or of drive device 2.

Figure 3:
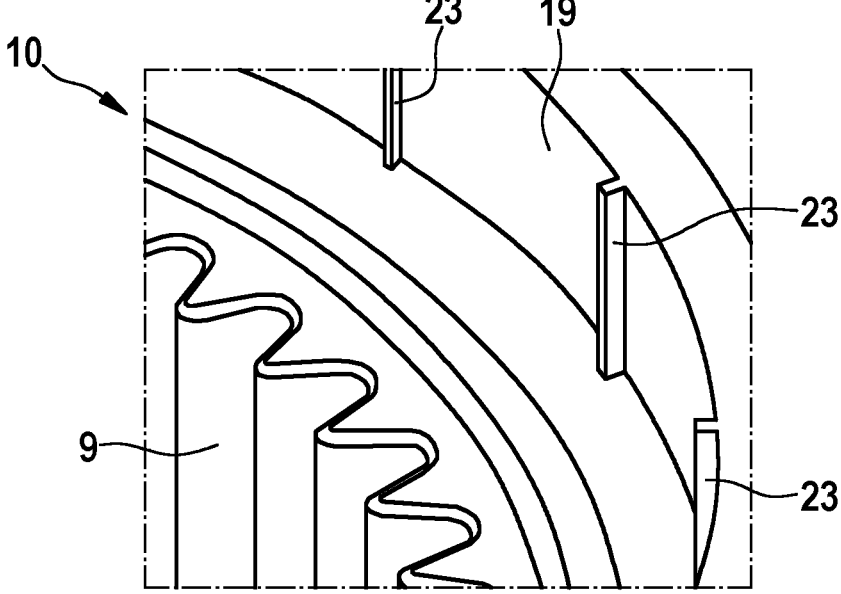
FIG. 3 shows an enlarged perspective view of a portion of the ring gear.

FIG. 3 shows an enlarged perspective view of the ring gear 9 in the area of the centering portion 19. The centering portion 19 comprises in particular multiple pinch ribs 23 radially protruding inward and distributed around the circumference. The pinch ribs 23 protrude only slightly from the inner side of the centering portion 19 and are designed to be plastically and/or elastically deformed when pushed onto the bearing cover 21 in order thereby to ensure a particularly secure fixation and centering of the ring gear 9 on the bearing cover 21. Optionally, multiple evenly distributed pinch ribs are also formed on a sheath outer wall of the ring gear 9, in particular integrally formed with the ring gear 9, which cooperate with the bearing cover 5 correspondingly for the centering and support of the ring gear 9 on the bearing cover 5. A centering of the electric motor or the rotor shaft 3 and the sun gear 20 is thus advantageously enabled.

According to an alternative embodiment example, the ring gear 9 is developed integrally with the bearing cover 5, which makes it possible to omit the additional anti-rotation means 10. The number of parts is thereby further reduced and the assembly is simplified.

5

The invention claimed is:

1. A drive device for an electromechanical brake booster, the drive device comprising:

an electric motor;

a bearing cover situated in a housing of the electric motor;

a rotor shaft rotatably mounted in the housing by at least one roller bearing that is held in a bearing seat of the bearing cover; and a transmission to which the rotor shaft is coupled and that includes a planetary gear train having a ring gear that is situated in a ring-gear portion of the bearing cover;

wherein:

the ring-gear portion is spaced apart from the bearing seat; and a set of multiple radial elevations, which are spaced apart from one another in a circumferential direction, cooperate with a single corresponding recess to prevent rotation of the ring gear relative to the bearing cover.

2. The drive device according to claim 1, wherein the planetary gear train further includes a sun gear situated in a rotationally fixed manner on the rotor shaft and a plurality of planetary gears.

3. The drive device according to claim 2, wherein the transmission is a spindle transmission that includes an axially slidably supported spindle and a spindle gear that (a) is rotatably supported and engaged with the spindle by way of a helical gearing and (b) forms a planetary gear support for the planetary gears.

4. The drive device according to claim 3, wherein the ring gear includes a meshing portion and a centering portion formed integrally with the meshing portion, the meshing portion interacts with the planetary gears, the ring gear is supported on a bearing cover of the spindle transmission by way of the centering portion of the ring gear, and the centering portion of the ring gear extends axially from the meshing portion in a direction away from an axial position of the planetary gears towards an axial position of the spindle.

5. The drive device according to claim 4, wherein the bearing cover of the spindle transmission extends axially between a first end of bearing cover of the spindle transmission and a second end of the bearing cover of the spindle transmission, the first end of the bearing cover of the spindle transmission is more distal to the axial position of the planetary gears than second end of the bearing cover of the spindle transmission, and the second end of the bearing cover of the spindle transmission is at more radially inward position than the first end of the bearing cover of the spindle transmission.

6. The drive device according to claim 1, wherein the set of multiple radial elevations is provided as part of the ring-gear portion of the bearing cover and is positioned within the single corresponding recess provided in the ring gear.

7. The drive device according to claim 1, wherein the set of multiple radial elevations is provided as part of the ring gear is positioned within the single corresponding recess provided in the ring-gear portion of the bearing cover.

8. The drive device according to claim 1, wherein:

the single corresponding recess is one of a plurality of recesses spaced apart from one another in the circumferential direction;

the multiple radial elevations of the set form one of a plurality of subsets of a plurality of radial elevations; and each respective one of the subsets (i) includes a respective one or more of the plurality of radial elevations and (ii) cooperates with a respective corresponding one of the plurality of recesses.

9. The drive device according to claim 8, wherein the subsets of the radial elevations and the radial recesses are situated in an evenly distributed manner about a circumference of the ring-gear portion.

10. A drive device for an electromechanical brake booster, the drive device comprising:

an electric motor; a transmission that includes a planetary gear train having a ring gear that forms a ring-gear portion of a bearing cover situated in a housing of the electric motor, so that the ring gear is integrally developed with the bearing cover; and a rotor shaft that is coupled to the transmission and that is rotatably mounted in the housing by at least one roller bearing that is held in a bearing seat of the bearing cover, wherein the bearing seat is spaced apart from the ring-gear portion of the bearing cover.

11. The drive device according to claim 10, wherein the drive device is arranged to drive a hydraulic pressure generator of a brake device of a motor vehicle.

12. A brake device for a motor vehicle, the brake device comprising:

a hydraulic pressure generator; and a drive device configured to drive the hydraulic pressure generator, the drive device including:

an electric motor; a bearing cover situated in a housing of the electric motor;

a rotor shaft rotatably mounted in the housing by at least one roller bearing that is held in a bearing seat of the bearing cover; and a transmission to which the rotor shaft is coupled and that includes a planetary gear train having a ring gear that is situated in a ring-gear portion of the bearing cover; wherein:

the ring-gear portion is spaced apart from the bearing seat; and a set of multiple radial elevations, which are spaced apart from one another in a circumferential direction, cooperate with a single corresponding recess to prevent rotation of the ring gear relative to the bearing cover.

* * * * *